Sept. 11, 1928.
E. HAGER
BAKING AND ROASTING APPLIANCE
Filed Feb. 14, 1927
1,683,611
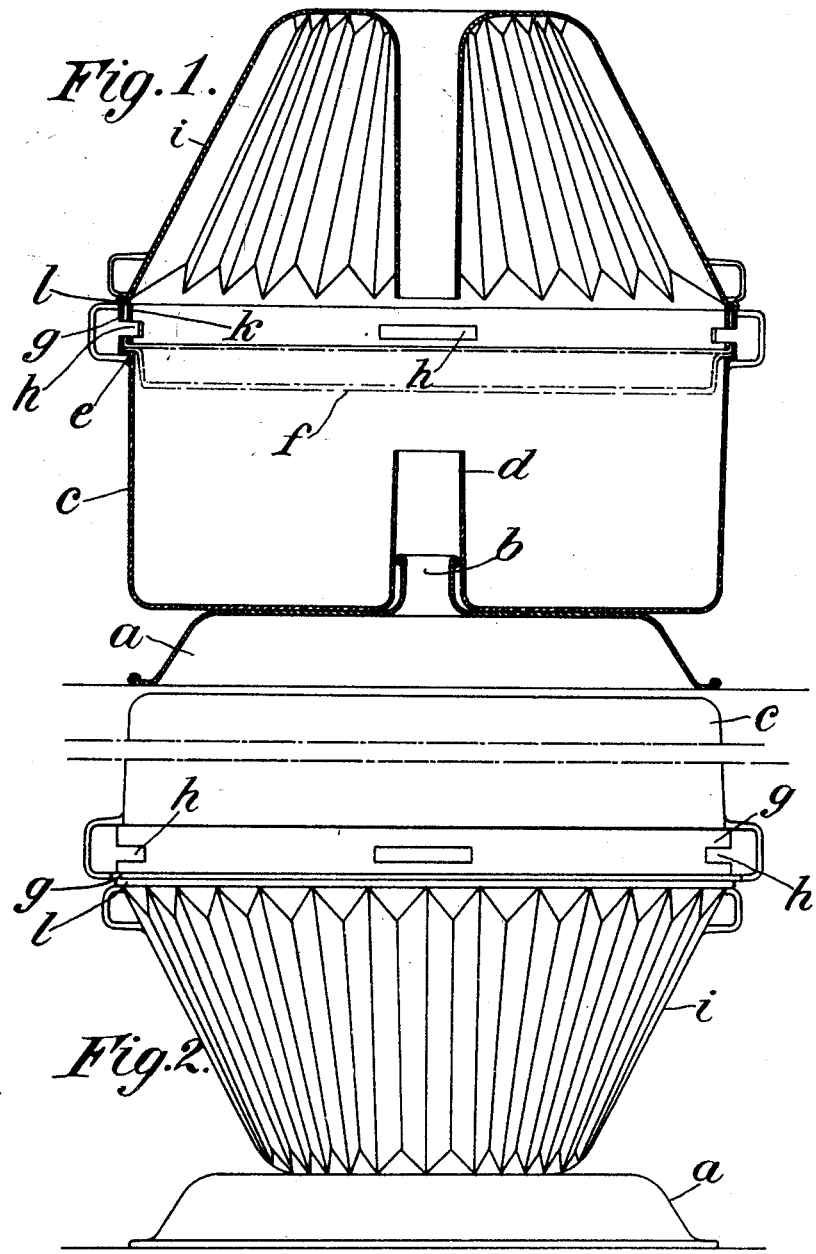
Inventor
Eugen Hager
por
attorney Patented Sept. 11, 1928.

1,683,611

UNITED STATES PATENT OFFICE.

EUGEN HAGER, OF OERLIKON, NEAR ZURICH, SWITZERLAND.

BAKING AND ROASTING APPLIANCE.

Application filed February 14, 1927. Serial No. 167,945, and in Switzerland February 25, 1926.

The present invention relates to a baking and roasting appliance in which a casserole and a deep baking mould, for instance a pound cake mould, are so constructed and adapted to fit one another, that they can be placed directly one upon the other in the one or other reversed order according to requirements, and be used in this way. Roasting or baking can therefore be carried out in one or other of these appliances as desired, and the other upper appliance can be used as a cover to prevent the heat escaping. A separate cover, which cannot be used otherwise, thus becomes superfluous and the appliance while capable of being used for many purposes, is simplified in construction.

The accompanying drawing illustrates a constructional example of the invention, Figure 1 showing a vertical section, Figure 2 an elevation of the appliance with its parts in reversed position, Figure 3 a part of a roasting grid belonging to the appliance and Figure 4 a part of a cake tin.

In the arrangement according to Figure 1, a casserole $c$ with inlet passage $d$, forming a continuation of the passage $b$ is mounted on the base $a$ provided with a central passage $b$ for the passage of the heating gases. This casserole has at the top an outwardly directed ledge $e$, on which for instance a cake tin $f$ provided with an upper edge flange $m$ can be placed. In order to enable the heating gases to rise, the edge flange of this cake tin is perforated (Fig. 4). The ledge $e$ has above it a cylindrical part $g$ provided with slots $h$. In this part $g$ a pound cake mould $i$ engages my means of a cylindrical part $k$, this mould resting by means of a flanged edge $l$ upon the upper edge of part $g$. Part $k$ is provided with slots of the same length and at the same level as the slots $h$ in part $g$. By turning the pound cake mould on the part $g$, the slots on both sides can be brought into register with one another to any desired extent or be completely covered, as required by the purpose for which the appliance is to be used at the time.

Figure 2 shows the reverse position of casserole $c$ and pound cake mould $i$, as used when baking is to be carried out in the latter. The mould is then supported in the position usual for this purpose on the base $a$ and the casserole $c$ rests with part $g$ on the edge $l$ of the mould $i$ and serves as a cover to retain the heat above. Any other deep baking mould can of course be used in place of the pound cake mould.

The appliance hereinbefore described and illustrated while possessing a minimum number of parts has numerous possibilities of use and enables a good utilization of the heating gases in whatever way it may be employed. The escape of the gases from the apparatus can be checked if desired by placing a suitable cover on the upper outlet aperture or by affixing a cap on the inner end of the tubular passage in the upper receptacle.

What I claim is:

1. In a baking and roasting appliance the detachable combination of a casserole and a deep baking mould fitting one within another along their circumference when these receptacles face one another, both receptacles being adapted to be used alternatively for holding the substance to be cooked whilst the other at the same time serves to retain the heating gases in an adjustable measure, a canal for the heating gases formed of tubular projections of the two receptacles extending in either position of use of the appliance from bottom to top thereof but being interrupted at the height of the joint of the two receptacles, openings being provided in the joining parts of the receptacles adapted to be brought to register in the required extent and to be fully covered by the guiding part of the other receptacle.

2. A baking and roasting device comprising a pan and a high baking mould engaging one with another on their open sides by means of circumferential guiding parts, a space being left in axial direction between the free edge of the inner of these guiding parts and a circumferential ledge of the other receptacle, a central tubular part extending from the bottom of each of said receptacles towards the other but without reaching the plane of said ledge, a relatively low pan with flat, unperforated bottom and provided with a perforated edge flange adapted to be supported by said ledge in one position of the device and by the opposite edge of the other receptacle in the reversed position of the device, each time in such a manner as to permit the hot gases rising from the tubular part of the lower receptacle to pass the perforations in the edge flange of the low pan and to enter into the upper receptacle.

3. In a cooking device comprising two receptacles each of which is adapted for use in the preparation of a food when either is used as a bottom receptacle, one of the receptacles being formed with an inset rim spaced from its marginal edge and the other of which is formed with an outset rim spaced from its marginal edge, one of the marginal edges of one receptacle adapted to telescope within the marginal edge of the other, the edge of the outside receptacle engaging the offset rim on the other receptacle, and the edge of the latter receptacle being spaced from the inset rim of the first receptacle, the inset rim and the edge of each receptacle being adapted to support an outturned rim of a third receptacle to hold it spaced from the bottom of each of the first mentioned receptacles when either is used as the bottom receptacles.

4. In a device as claimed in claim 3, and in combination therewith of an open tubular column extending from the bottom of each receptacle, the tubular column of one receptacle extending a distance substantially equal to the height of that receptacle, and the tubular column of the other receptacle a distance substantially less than the height of the other receptacle.

In testimony whereof I have affixed my signature.

EUGEN HAGER.